US 6,638,548 B1

(12) United States Patent
Moore

(10) Patent No.: US 6,638,548 B1
(45) Date of Patent: Oct. 28, 2003

(54) CALCIUM PHOSPHATE FROM HATCHERY BY-PRODUCT

(75) Inventor: William P. Moore, Hopewell, VA (US)

(73) Assignee: Agri-Nutrients Technology Group, Inc., Disputanta, VA (US)

( * ) Notice: Subject to any disclaimer, the term of this patent is extended or adjusted under 35 U.S.C. 154(b) by 62 days.

(21) Appl. No.: 10/116,005

(22) Filed: Apr. 5, 2002

(51) Int. Cl.$^7$ .................................................. A23K 1/00
(52) U.S. Cl. ..................... 426/74; 426/644; 426/646; 426/656; 426/626; 426/636; 426/807
(58) Field of Search .......................... 426/74, 644, 646, 426/656, 807, 626, 636

(56) References Cited

U.S. PATENT DOCUMENTS

| | | | | |
|---|---|---|---|---|
| 3,939,280 A | * | 2/1976 | Karnemaat | 426/2 |
| 4,217,370 A | * | 8/1980 | Rawlings et al. | 426/98 |
| 4,369,199 A | * | 1/1983 | Katzen | 426/641 |
| 2002/0150651 A1 | * | 10/2002 | Scheideler et al. | 426/2 |

FOREIGN PATENT DOCUMENTS

GB 2332426 * 6/1999

* cited by examiner

Primary Examiner—Chhaya Sayala

(57) ABSTRACT

A method of preparing particulate calcium phosphate animal feed minerals and useful carbon dioxide by coreacting calcareous proteinacious by-products recovered from poultry hatcheries with phosphoric acid. Aqueous hatchery by-product containing protein and calcium in a weight ratio between 0.25 and 1.25 is comminuted until the contained dry matter particles exhibit diameters less than 1 millimeter and are reactive with phosphoric acid. The calcium in the comminuted hatchery by-product is coreacted with phosphoric acid using between one and two mols of P per mol of Ca until carbon dioxide formation ceases and the reacted aqueous hatchery by-product exhibits a pH between 2 and 4. The calcium phosphate granules are dried by commercial means until the protein hardens and forms a matrix bonding the calcium phosphate into attrition resistant granules of animal feed mineral.

10 Claims, No Drawings

CALCIUM PHOSPHATE FROM HATCHERY BY-PRODUCT

BACKGROUND OF THE INVENTION

1. Field of the Invention

This invention relates to the recovery of by-product wastes from the poultry industry as useful products. More particularly the present invention is directed to a method of recovery of aqueous proteinacious calcareous by-products from hatchery operations of the poultry industry. It was discovered that the aqueous by-products containing calcium carbonate could be converted under special conditions to a new protein bonded attrition resistant granular calcium phosphate animal feed mineral and useful carbon dioxide by reaction with phosphoric acid.

2. Description of Related Art

The by-products produced in the operation of hatcheries in the poultry industry include egg shells, proteinacious membranes and residues remaining with the egg shells, feathers, dead chicks and other materials related to the hatching of eggs and recovery of the chicks. These by-products pose a problem of environmentally sound and economical disposal. As the scale of the hatchery operations has increased, the size of the problem and its economic impact on the industry have become matters of serious concern.

In some cases the hatchery by-products are simply landfilled near the hatchery. In more sophisticated operations, trucks collect aqueous hatchery by-products from a number of hatcheries and transport them to a central location where some of the liquid protein is recovered by gravity and the remaining solids are landfilled. In another procedure, the collected hatchery by-products are dried to recover the protein and calcium carbonate values. Although the latter method provides an environmentally sound recovery method, the recovered product has a very low value.

The hatchery by-product is recovered in the hatcheries by wash downs and other methods which introduce water, usually in amounts of 25 to 50 percent. The protein content of the by-product comprises albumen, meat and feather proteins and exhibits an amino acid profile suitable for animal nutrition. The calcium is largely in the form of calcium carbonate in the egg shells which usually comprise the largest source of calcium. Calcium is also derived from calcium carbonate, some calcium phosphate from bones, and small amounts of other calcium salts.

The coreaction of phosphoric acid and calcium carbonate to form calcium phosphates is well known and has been practiced on a very large scale for a long time to produce calcium phosphate as animal feed minerals.

The calcium in hatchery by-product is covered and occluded by proteins, lipoproteins, and other materials so that it has not been possible heretofore to obtain a high degree of reaction of acid with the calcium carbonate. A low degree of reaction leaves large amounts of carbonate unreacted and this dilution keeps the concentrations of phosphorus and calcium low. Any products of the prior art were of low value and not economically competitive with commercially produced calcium phosphates. A low degree of reaction, or a slow reaction, does not produce carbon dioxide in a manner, or amount, where it may be economically recovered for valuable use.

The prior art has not provided a method for preparing attrition resistant granular calcium phosphate and useful carbon dioxide by coreacting calcareous by-products from poultry hatcheries and phosphoric acid.

It is therefore an object of this invention to provide a method of preparing attrition resistant granular proteinacious calcium phosphate animal feed minerals and useful carbon dioxide by coreacting calcareous by-products containing calcium carbonate from poultry hatchery by-products and phosphoric acid.

It is another object to provide the operating parameters of the method which must be followed to successfully carry out the method.

It is a further object of the invention to provide a new and effective protein matrix bonded, attrition resistant, calcium phosphate granular animal feed mineral composition prepared by the new method.

SUMMARY OF THE INVENTION

I have now discovered a method of preparing attrition resistant granular proteinacious calcium phosphate animal feed minerals and useful carbon dioxide by coreacting calcareous by-product from poultry hatcheries and phosphoric acid. This method uses a flowable aqueous hatchery by-product containing particles of dry matter amounting to between 35 and 70 percent of the flowable by-product.

The flowable by-product containing protein and calcium moieties in a weight ratio between 0.25 and 1.25 with the calcium moieties consisting essentially of calcium carbonate is comminuted until the particles of dry matter exhibit diameters less than 1 millimeter and the calcium moieties exhibit coreactivity with phosphoric acid.

The comminuted flowable by-product is admixed with an amount of phosphoric acid sufficient to provide between 1.0 and 2.0 molecules of phosphorus per molecule of calcium in the flowable by-product. The phosphoric acid and the reactive calcium moieties are coreacted, at a temperature between 20 and 100° C. to form proteinacious calcium phosphate and carbon dioxide gas, until carbon dioxide gas formation ceases and the reacted aqueous flowable by-product exhibits a pH between 2 and 4.

The reacted flowable by-product is admixed with an amount of recycled proteinacious calcium phosphate sufficient to provide a water concentration between 7 and 18 percent in the damp solids formed by the mixing. The damp solids thus formed are rolled by means of a granulator until spheroid granules containing calcium phosphate homogeneously mixed with protein are formed.

The spheroid granules are dried until the protein hardens and forms a matrix bonding the calcium phosphate into attrition resistant granules of animal feed mineral containing between 5 and 20 percent protein, between 12 and 18 percent calcium and between 15 and 24 percent phosphorus.

DESCRIPTION OF THE INVENTION

The instant invention is directed to a method of effectively performing the simple chemical coreaction of calcium carbonate and phosphoric acid to produce calcium phosphate under very difficult conditions. The calcium in hatchery by-product is occluded by proteinacious materials which make its coreaction with phosphoric acid very slow and incomplete. I have now discovered a method whereby the reaction may be expeditiously carried to completion to utilize the protein as a matrix in forming attrition resistant high analysis calcium phosphate animal feed minerals and useful carbon dioxide. The reaction must be performed in flowable aqueous hatchery by-product. To achieve granulation substantial dry recycled animal feed mineral must be mixed with the reacted flowable aqueous hatchery by-product, and the granules formed must be dried until the proteins harden to form a bonding matrix throughout the calcium phosphate granules.

In the instant method of preparing attrition resistant granular proteinacious calcium phosphate animal feed minerals and useful carbon dioxide by coreacting calcareous by-products from poultry hatcheries and phosphoric acid, it was discovered that it was necessary to provide a flowable aqueous hatchery by-product containing particles of dry matter amounting to between 35 and 70 percent of the flowable by-product. When concentrations higher than 70 percent are used, the calcium is not effectively reacted. It is effectively reacted below 35 percent but the amounts of recycle required to form damp solids for granulation are uneconomically large. The dry matter preferably amounts to between 40 and 55 percent of the flowable aqueous hatchery by-product.

It is key to the success of the method that the flowable by-product, containing protein and calcium moieties in a weight ratio between 0.25 and 1.25 with the calcium moieties consisting essentially of calcium carbonate, be comminuted until the particles of dry matter exhibit diameters less than 1 millimeter and that the calcium moieties exhibit coreactivity with phosphoric acid. The amount of protein relative to the calcium controls the hardness and attrition resistance of the granules of animal feed minerals produced. The protein to calcium weight ratio in the flowable aqueous hatchery by-product is preferably between 0.50 and 1.25.

The comminuted flowable by-product must be admixed with an amount of phosphoric acid sufficient to provide between 1.0 and 2.0 molecules of phosphorus per molecule of calcium in the flowable by-product. This is sufficient phosphoric acid to form compounds ranging from monocalcium phosphate to dicalcium phosphate. It is preferable for the complete formation of carbon dioxide gas to provide between 1.5 and 2.0 molecules of phosphorus per molecule of calcium.

It is also preferred that the carbon dioxide formed in the coreaction of the phosphoric acid and the reactive calcium moieties is recovered by reaction with aqueous potassium hydroxide by means of a gas scrubber to form potassium carbonate, which is useful as an animal feed mineral. The gas scrubber may consist of commercial devices including a packed tower, a bubble plate tower, or a spray tower equipped with a demister. The potassium carbonate formed may be dried by conventional means to produce a dry particulate animal feed mineral. It is preferred that the potassium carbonate formed exhibits a potassium to carbonate molecular ratio between 1.5 and 2.0. Higher ratios make it difficult to recover crystalline potassium carbonate, and lower ratios cause inefficient recoveries of the carbon dioxide formed.

The phosphoric acid and the calcium moieties exhibiting coreactivity with phosphoric acid must be coreacted until carbon dioxide gas formation ceases and the reacted aqueous flowable by-product exhibits a pH between 2 and 4. It was found that the phosphoric acid coreacted with the flowable aqueous hatchery by-product could be wet process phosphoric acid so long as the phosphoric acid contained less than 1 part of fluorine per hundred parts of phosphorus by weight.

To make possible effective granulation, the reacted flowable by-product is admixed with an amount of recycled proteinacious calcium phosphate sufficient to provide a water concentration between 7 and 18 percent in the damp solids formed by the mixing. Water concentrations outside the prescribed range do not allow preparation of strong granules.

The damp solids are rolled by means of a granulator until spheroid granules containing calcium phosphate mixed with protein are formed. A conventional cylindrical TVA-type granulator, a rotating double cone, or a pan granulator may be effectively used. The preferred type of granulator employs a pan operating clockwise enclosing a rotor about one-third of the diameter of the pan and operating counter-clockwise at between 10 and 100 times the revolutions per minute of the pan.

It is necessary to dry the spheroid granules until the protein hardens and forms a matrix bonding the calcium phosphate into attrition resistant granules of animal feed mineral containing between 5 and 20 percent protein, between 12 and 18 percent calcium and between 15 and 24 percent phosphorus.

PREFERRED EMBODIMENT OF THE INVENTION

The following examples are provided to illustrate the preferred embodiments of the invention.

EXAMPLE 1

This example illustrates an efficacious method of preparing attrition resistant granular proteinacious calcium phosphate animal feed minerals and useful carbon dioxide by coreacting calcareous by-products from poultry hatchery by-product and phosphoric acid.

A sample of hatchery by-product was collected at an operating poultry hatchery and water was added to bring the dry matter to 55.00 percent by weight and produce a flowable calcareous by-product containing 16.98 percent protein, 16.12 percent calcium and 45.00 percent water. The hatchery by-product consisted primarily of egg shells, proteinacious fluids in and on the egg shells, feathers, dead chicks, and other incidental proteins. The calcium comprised substantially calcium carbonate derived from egg shells and chick bones.

The flowable liquid by-product amounting to 40 kilograms was charged to a Littleford 180 Intensive Mixer equipped with ploughs to fluidize the flowable liquid and a high speed chopper to finely comminute the by-product until the dry matter particles' diameters were smaller than 1 millimeter. Analysis of the comminuted flowable by-product was determined to be as follows:

| Component | Wt % |
| --- | --- |
| Calcium | 16.12 |
| Protein | 16.98 |
| Dry Matter | 55.00 |
| Water (by diff.) | 45.00 |

To the flowable hatchery by-product containing 1.05 parts protein per part of calcium while being agitated in the Littleford Intensive Mixer was added wet process black phosphoric acid, containing less than 1 part of fluorine per 100 parts of phosphorus, amounting to 1.8 molecules of phosphorus per molecule of calcium in the hatchery by-product.

The phosphoric acid added in the amount of 75.00 kilograms was analyzed with results as follows:

| Component | Wt % |
|---|---|
| Phosphorus | 24.0 |
| Dry Matter | 80.0 |
| Water (by diff.) | 20.0 |

The mixture was heated to 60° C. and reacted until carbon dioxide evolution from the flowable hatchery by-product ceased and its pH was measured to be 2.3. The carbon dioxide evolved was recovered by absorption into liquid potassium hydroxide and the amount recovered was 14.2 kilograms.

The flowable liquid hatchery by-product amounting to 140.8 kilgrams remained fluid and was analyzed as follows:

| Component | Wt % |
|---|---|
| Calcium | 9.16 |
| Protein | 9.64 |
| Phosphorus | 12.78 |
| Dry Matter | 59.66 |
| Water (diff.) | 40.34 |

The flowable liquid hatchery by-product was discharged from the Littleford Intensive Mixer into an Eirich R-11 mixer-granulator and there mixed with dried calcium phosphate passing through a 20 mesh U.S. Standard screen, amounting to 474.67 kilograms and was analyzed as follows:

| Component | Wt % |
|---|---|
| Calcium | 15.2 |
| Protein | 16.0 |
| Phosphorus | 21.2 |
| Dry Matter (diff.) | 99.0 |
| Water | 1.00 |

The pan type mixer-granulator was operated with the pan turning clockwise and a rotor having a diameter of one-third that of the pan operating in the pan counterclockwise at 20 times the revolutions per minute of the pan, until primarily spheroid granules were formed.

The granular product was discharged from the granulator and dried in a countercurrently fired rotary dryer until the proteins hardened to form a strong matrix through the attrition resistant calcium phosphate animal feed mineral product.

After screening to the desired granule size range of −14+30 mesh U.S. Standard screen size, the fines and ground oversize was recycled leaving 79.25 kilograms of dry, on-size, attrition resistant, proteinacious calcium phosphate animal feed mineral granules exhibiting analyses as follows:

| Component | Wt % |
|---|---|
| Calcium | 15.2 |
| Protein | 16.0 |
| Phosphorus | 21.2 |
| Dry Matter (diff.) | 99.0 |
| Water | 1.00 |

EXAMPLE 2

This example illustrates the effectiveness of protein in forming a hard matrix which provides an attrition resistant calcium phosphate granular feed mineral.

A product was prepared in the manner of Example 1 except that limestone was used as the source of calcium carbonate instead of calcareous hatchery waste. Attrition resistance of the calcium phosphate granules made from lime and from hatchery by-product from Example 1 were compared. Two hundred gram samples of each product, prescreened to −14+30 mesh size, were placed in an 8-inch diameter cylindrical vessel, equipped with four 0.5 longitudinal lifts, rotating at a speed of 120 revolutions per minute, and held there for a period of 10 minutes. The determinations were replicated four times for each product.

After the 10 minute period, the samples were removed from the steel jar and screened to determine the amount of attrition which had occurred by measuring the amount of minus 30 mesh material formed. The results are listed as follows:

| Calcium Source | Limestone | Hatchery B.P. |
|---|---|---|
| Grams Sample | 200 | 200 |
| Grams Fines Formed | 14.4 | 1.6 |
| Percent Fines | 7.2 | 0.8 |

EXAMPLE 3

This example illustrates acceptability of the granular animal feed mineral of the instant invention as a part of chick growing ration.

Weight gain and average feed intake was measured for chicks fed the same rations with the exception of the source of phosphorus. The calcium phosphate of Example 1 and commercial calcium phosphate containing 21 percent phosphorus were combined with the regular basal feed rations of chicks. Each treatment was made with six pens each containing five chicks, and the reported values represent an average of all of the pens. The amounts of phosphorus in the complete rations were varied from 0.1 to 0.2 percent and the feed intakes and weight gains are recorded in the following table:

| Phosphorus Source | Ex 1 | Com. P | Ex 1 | Com. P |
|---|---|---|---|---|
| Wt % P in ration | 0.1 | 0.1 | 0.2 | 0.2 |
| Avg feed intake, gms/bird | 1015 | 965 | 974 | 924 |
| Avg body weight, gms/bird | 779 | 750 | 759 | 744 |

The results indicate that the use of hatchery by-product served as an effective source of phosphorus, causing no reduction in ration intake while supplying extra protein, and providing a small increase in weight gain.

EXAMPLE 4

This example illustrates the recovery of carbon dioxide gas from the hatchery by-product method for calcium phosphate and the utilization of the carbon dioxide to produce animal feed mineral potassium carbonate.

In Example 1, 14.2 kilograms of carbon dioxide were evolved from the coreaction of phosphoric acid and the calcium carbonate of the flowable hatchery by-product. The carbon dioxide was conducted through a sealed flue to a scrubber where a 20 weight percent aqueous solution of potassium hydroxide was circulated. After absorbing the carbon dioxide in a molecular ratio of 2 potassiums per carbon dioxide, an aqueous solution amounting to 194.925 kilograms was recovered with a composition as follows:

| Component | Wt % |
|---|---|
| Potassium Carbonate | 22.8 |
| Water | 77.2 |

The recovered scrubbing solution was spray dried and crystalline potassium carbonate was recovered amounting to 44 kilograms exhibiting a pH of 10.1 and a moisture content of 1.6 percent. The potassium carbonate was water soluble and suitable for use as a buffering animal feed mineral.

I claim:

1. A method of preparing attrition resistant granular proteinacious calcium phosphate animal feed minerals by coreacting calcareous by-products from poultry hatcheries and phosphoric acid, the method comprising:
    (a) providing a flowable aqueous hatchery by-product containing particles of dry matter amounting to between 35 and 70 percent of the flowable by-product;
    (b) comminuting the flowable by-product containing protein and calcium moieties in a weight ratio between 0.25 and 1.25, the calcium moieties consisting essentially of calcium carbonate, until the particles of dry matter exhibit diameters less than 1 millimeter and the calcium moieties exhibit coreactivity with phosphoric acid;
    (c) admixing with the comminuted flowable by-product an amount of phosphoric acid sufficient to provide between 1.0 and 2.0 molecules of phosphorus per molecule of calcium in the flowable by-product;
    (d) coreacting the phosphoric acid and the calcium moieties at a temperature between 20 and 100° C. to form proteinacious calcium phosphate and carbon dioxide gas until carbon dioxide gas formation ceases and the reacted aqueous flowable by-product exhibits a pH between 2 and 4;
    (e) admixing the reacted flowable by-product with an amount of recycled proteinacious calcium phosphate sufficient to provide a water concentration between 7 and 18 percent in the damp solids formed by the mixing;
    (f) rolling the damp solids by means of a granulator until spheroid granules containing calcium phosphate mixed with protein are formed; and,
    (g) drying the spheroid granules until the protein hardens and forms a matrix bonding the calcium phosphate into attrition resistant granules of animal feed mineral containing between 5 and 20 percent protein, between 12 and 18 percent calcium, and between 15 and 24 percent phosphorus.

2. The method of claim 1 wherein the flowable aqueous hatchery by-product provided contains particles of dry matter amounting to between 40 and 55 percent of the flowable aqueous hatchery by-product.

3. The method of claim 1 wherein the flowable aqueous hatchery by-product provided contains protein and calcium moieties in a weight ratio between 0.50 and 1.25.

4. The method of claim 1 wherein the phosphoric acid coreacted with the flowable aqueous hatchery by-product comprises wet process phosphoric acid containing less than 1 part of fluorine per 100 parts of phosphorus by weight.

5. The method of claim 1 wherein the amount of phosphoric acid is sufficient to provide between 1.5 and 2.0 molecules of phosphorus per molecule of calcium.

6. The method of claim 1 wherein the carbon dioxide formed in the coreaction of the phosphoric acid and the reactive calcium moieties is recovered by reaction with aqueous potassium hydroxide by means of a gas scrubber to form potassium carbonate.

7. The method of claim 6 wherein the potassium carbonate formed exhibits a potassium to carbonate molecular ratio between 1.5 and 2.0.

8. The method of claim 6 wherein the potassium carbonate formed is dried by conventional means to produce a dry particulate animal feed mineral.

9. A protein matrix bonded attrition resistant calcium phosphate granular animal feed mineral composition containing between 5 and 20 percent protein, between 12 and 18 percent calcium, and between 15 and 24 percent phosphorus prepared by the method of claim 1.

10. The method of claim 1 wherein attrition resistant granules of animal feed mineral exhibiting granule sizes effective as animal feed minerals are recovered from granules exhibiting larger and smaller sizes by size-separating means, and the larger and smaller granules are recycled as proteinacious calcium phosphate admixed with the reacted flowable by-product to provide damp solids formed by the mixing.

* * * * *